Patented Feb. 29, 1944

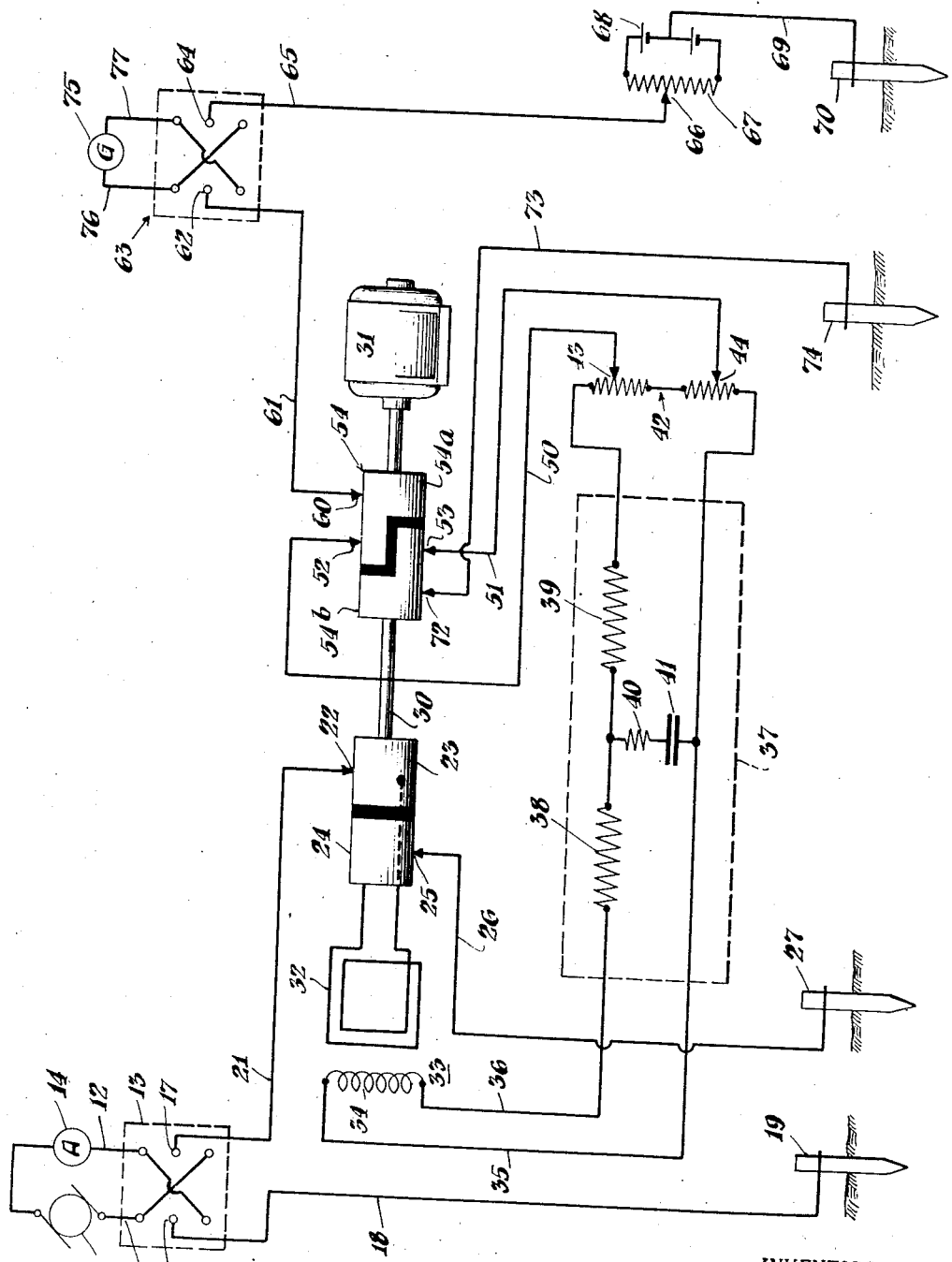

2,342,629

UNITED STATES PATENT OFFICE 2,342,629

COUPLING CIRCUIT

Haakon M. Evjen and William Bradley Lewis, Houston, Tex., assignors to Nordel Corporation, Houston, Tex., a corporation of Delaware Application July 1, 1942, Serial No. 449,252

5 Claims. (Cl. 175—182)

This invention relates to a novel and improved coupling circuit for coupling independent electric circuits and more particularly to a coupling circuit deriving energy from a circuit carrying either direct current or low frequency alternating current and producing a secondary direct current that is directly proportional to the amplitude of said first current.

This application is a continuation in part of a copending application of Evjen and Lewis, Ser. 440,264, filed Apr. 23, 1942.

An object is to provide a novel and improved coupling circuit of the above type in which no direct current path is established between the coupled circuits.

Another object of the invention is to provide a novel and improved circuit of the above type which is adapted for use with a circuit carrying direct current or carrying alternating current of such low frequency that ordinary transformer coupling is not feasible.

Other objects and advantages will be apparent as the nature of the invention is more fully disclosed.

The present coupling circuit has a wide application in the field of electrical measurements. A particular embodiment as applied to a geophysical prospecting system is set forth herein for purposes of illustration only.

Although the novel features which are believed to be characteristic of this invention are pointed out more particularly in the claims appended hereto, the invention itself may be better understood by referring to the following description, taken in connection with the accompanying drawing in which a specific embodiment thereof has been set forth for the purposes of illustration.

In the drawing:

The figure is a schematic diagram illustrating the invention applied to an electrical geophysical prospecting system.

In accordance with the present invention, the circuits are coupled by means of a transformer having a rotating coil and arranged so that when the primary coil is supplied with direct current, an alternating current is induced in the secondary coil having an amplitude proportional to the primary current and a frequency corresponding to the speed of rotation of the rotating coil. The induced voltage is passed through a filter network having a frequency response characteristic such that the current in the output side of the network is independent of frequency. This current is used to derive a measuring voltage which, after mechanical rectification, may be used as a measure of the picked-up potential of the geophysical prospecting system.

Referring to the drawing more in detail, a source 10 of direct current is connected by means of lines 11 and 12 to a reversing switch 13 which may be of any suitable type, for example, of the type shown in the copending application of Haakon M. Evjen, Ser. 432,176, Pat. 2,314,874, dated March 30, 1943, which shows a switch adapted to reverse the connections at a predetermined frequency. An ammeter 14 may be used for purposes of regulation and control.

The reversing switch 13 is provided with a pair of reversing contacts 16 and 17. The reversing contact 16 is shown as connected by a line 18 to an earth current electrode 19. The reversing contact 17 is connected by a line 21 to a brush 22 which makes contact with a slip ring 23. A slip ring 24 makes contact with a brush 25 which is connected by a line 26 to the other earth current electrode 27.

The slip rings 22 and 24 are mounted on a shaft 30 which is driven at a predetermined controlled speed by a motor 31. The slip rings 22 and 24 are connected to the terminals of a coil 32 which is mounted for rotation with the shaft 30 and forms the primary of a transformer 33 having a stationary secondary coil 34.

The secondary coil 34 is connected by lines 35 and 36 to a filter network 37 which is of a type designed to pass a current which is independent of frequency. In the embodiment shown the filter network 37 comprises a pair of series resistors 38 and 39 and a parallel branch comprising a resistor 40 and a condenser 41. The output circuit of the filter 37 is connected to a potentiometer 42 having a pair of sliding contacts 43 and 44. The arrangement of the filter elements is such that the current through the potentiometer 42 is proportional to the current in the earth circuit regardless of the frequency of rotation of coil 32. In this way the current in the output circuit is made independent of any variation in speed of operation of the motor 31.

The contacts 43 and 44 are connected by lines 50 and 51 to contacts 52 and 53 respectively of a commutator 54 which is also mounted on the shaft 30 and is driven in synchronism with the coil 32. A segment 54a of the commutator 54 is connected by a brush 60 and line 61 to a reversing contact 62 of a reversing switch 63 which is similar to the reversing switch 13 and is connected to be operated in synchronism therewith. The other reversing contact 64 of the reversing switch 63 is connected by a line 65 to the sliding contact 66 of a voltage dividing resistor 67 across which is connected a source of current shown as a battery 68, the midpoint of which is connected by a line 69 to an earth potential pick-up electrode 70.

A segment 54b of the commutator 54 is connected by a brush 72 and line 73 to the other earth potential pick-up electrode 74. A galvanometer 75 is connected by lines 76 and 77 to the reversing switch 63.

The earth electrodes 19, 27, 70 and 74 may be of any convenient type suited to cause a current to pass through the earth and to derive a potential from the earth's field. The electrodes 70 and 74 are located within the field of influence of the current produced by the electrodes 19 and 27.

In the operation of this system a current is passed through the earth between the electrodes 19 and 27 which has a definite value and frequency, the value being dependent upon the source 10 and the frequency being dependent upon the frequency of operation of the reversing switch 13. This earth current produces a flux in the coil 32 which is proportional to the instantaneous current flowing through the earth current circuit. It is to be understood, of course, that the coil 32 may be connected to receive only a predetermined portion of the total earth current and has been shown as connected in series with the earth current circuit so that the total earth current flows through this coil, for purposes of illustration only.

The rotating coil 32 induces a voltage in the coil 34 which is a function of the instantaneous earth current and of the frequency of reversal. The speed of reversal is dependent upon the speed of operation of the motor 31. This alternating current from the secondary 34 is passed through the filter 37 and the potentiometer 42 to produce a potential drop in the potentiometer 42 which is at all times directly proportional to the total earth current and is independent of the frequency of operation of the motor 31.

The earth potential is picked up by the pick-up electrodes 70 and 74 which are located within the field of influence of the current produced by the electrodes 19 and 27. This picked up potential is of a frequency corresponding to the frequency of the earth current, the latter being determined by the reversing switch 13. The picked up potential is accordingly rectified by the reversing switch 63 which operates in synchronism with the switch 13 so as to produce a unidirectional current across the galvanometer 75.

The earth potential circuit includes the portion of the potentiometer 42 between the contacts 43 and 44. The potentiometer potential is applied in such a way as to oppose the picked-up potential. Inasmuch as the potential across the potentiometer 42 is an alternating current potential, it is first rectified mechanically by the commutator 54 which is operated in synchronism with the coil 32. This rectified potential is thus applied to the potential circuit to oppose the potential picked up by the electrodes 70 and 74 and is adjusted by means of the contacts 43 and 44 so as to produce a zero reading on the galvanometer 75 when a balance has been obtained. It is to be noted that at this point of zero reading no current flows in the potential circuit. Consequently, the effect of line resistance, contact resistances or commutator resistance is eliminated.

In making this measurement the effect of any residual earth current which would tend to produce a constant direct potential across the electrodes 70 and 74 is eliminated by suitable adjustment of the potentiometer 67. This adjustment may be made, for example, while no current is flowing through the earth circuit, so that the only effect on the galvanometer 75 represents the effect of the residual earth current. It may also be made during operation of the system inasmuch as the residual earth current, which is a unidirectional current, is reversed by the reversing switch 63 to produce an alternating current at the galvanometer 75, causing fluctuation of the galvanometer. The adjustment of the contact 66 may accordingly be made to eliminate these fluctuations of the galvanometer. Any drift in the natural earth potential will be immediately perceived and can be compensated for by readjustment of the potentiometer.

The setting of the potentiometer 42 measures the effective impedance of the earth to an electric current of the frequency at which the measurement is being taken. The measurement is repeated at different low frequencies and in different parts of the area under investigation. The various readings thus obtained may be interpreted to give an indication of the characteristics of the area under investigation as set forth in the Evjen Patent 2,294,395, dated Sept. 1, 1942.

It is to be noted that the above described coupling circuit may be used to couple a secondary direct current circuit to a primary circuit carrying direct current or a low frequency alternating current and may be used for various measuring devices where a direct measuring potential having the characteristics above mentioned is required.

Although a specific embodiment of the invention has been shown for purposes of illustration, it is to be understood that the invention is not to be restricted thereto, but that various changes and modifications may be made therein as will be readily apparent to a person skilled in the art. The invention is only to be limited in accordance with the scope of the following claims.

What is claimed is:

1. A coupling circuit for coupling a primary circuit carrying direct current or low frequency alternating current to a secondary circuit for supplying to said secondary circuit a voltage drop proportional to the current flowing in said primary circuit for making precision measurements, said coupling circuit comprising a primary coil coupled magnetically to a secondary coil, means connecting said primary coil to be continually energized from the said primary circuit by an amount proportional to the current flowing therein so as to set up a flux through said secondary coil proportional to said energization, means rotating said primary coil with respect to said secondary coil to vary periodically the flux through said secondary coil to set up an alternating potential across said secondary coil whose frequency is the same as the frequency of said variations of flux and whose amplitude is a function of the primary current and of the rate of variation of said flux, and a transmission channel connecting said secondary coil to supply a voltage drop to said secondary circuit, said channel including a filter network having frequency transmission characteristics to compensate for changes in current intensity in said secondary winding due to variation in speed of rotation of said primary coil, so that the current passed by said filter network is unaffected by changes in speed of rotation of said coil and is a function only of the current flowing in said primary circuit.

2. A coupling circuit for coupling a primary circuit carrying direct current or low frequency alternating current to a secondary circuit carrying direct current for supplying to said secondary circuit a voltage drop proportional to the current flowing in said primary circuit for making precision measurements, said coupling circuit comprising a primary coil coupled magnetically to a secondary coil, means connecting said primary coil to be continually energized from the said primary circuit by an amount proportional to the current flowing therein so as to set up a flux through said secondary coil proportional to said energization, means rotating said primary coil with respect to said secondary coil to vary periodically the flux through said secondary coil to set up an alternating potential across said secondary coil whose frequency is the same as the frequency of said variations of flux and whose amplitude is a function of the primary current and of the rate of variation of said flux, and a transmission channel connecting said secondary coil to supply a voltage drop to said secondary circuit, said channel including a filter network having frequency transmission characteristics to compensate for changes in current intensity in said secondary winding due to variation in speed of rotation of said primary coil, so that the current passed by said filter network is unaffected by changes in speed of rotation of said coil and is a function only of the current flowing in said primary circuit, a rectifier connected to rectify the output current from said network, and connections supplying said rectified current to said secondary circuit.

3. A coupling circuit for coupling a primary circuit carrying direct current or low frequency alternating current to a secondary circuit carrying direct current for supplying to said secondary circuit a voltage drop proportional to the current flowing in said primary circuit for making precision measurements, said coupling circuit comprising a primary coil coupled magnetically to a secondary coil, means connecting said primary coil to be energized in accordance with the amount of current flowing in said primary circuit so as to set up a flux through said secondary coil proportional to said energization, means rotating said primary coil with respect to said secondary coil to vary periodically the flux through said secondary coil so as to produce an alternating potential in said secondary coil having a frequency equal to the frequency of rotation of said primary coil and whose amplitude is a function of the primary current and of the rate of variation of said flux, and a transmission channel connecting said secondary coil to supply a voltage drop to said secondary circuit, said channel including a filter network having frequency transmission characteristics to compensate for changes in current intensity in said secondary winding due to variation in speed of rotation of said primary coil, so that the current passed by said filter network is unaffected by the changes in speed of rotation of said coil and is a function only of the current flowing in said primary circuit, a potentiometer connected to receive the output current from said network so as to set up therein a potential drop proportional only to the current flowing in said primary circuit and having a frequency corresponding to the speed of rotation of said primary coil, means rectifying said potential drop and means supplying said rectified potential to said secondary circuit.

4. A coupling circuit for coupling a primary circuit carrying direct current or low frequency alternating current to a secondary circuit carrying direct current for supplying to said secondary circuit a voltage drop proportional to the current flowing in said primary circuit for making precision measurements, said coupling circuit comprising a primary coil coupled magnetically to a secondary coil, means connecting said primary coil to be energized in accordance with the amount of current flowing in said primary circuit so as to set up a flux through said secondary coil proportional to said energization, means rotating said primary coil with respect to said secondary coil to vary periodically the flux through said secondary coil so as to produce an alternating potential in said secondary coil having a frequency equal to the frequency of rotation of said primary coil and whose amplitude is a function of the primary current and of the rate of variation of said flux, and a transmission channel connecting said secondary coil to supply a voltage drop to said secondary circuit, said channel including a filter network having frequency transmission characteristics to compensate for changes in current intensity in said secondary winding due to variation in speed of rotation of said primary coil, so that the current passed by said filter network is unaffected by changes in speed of rotation of said coil and is a function only of the current flowing in said primary circuit, a potentiometer connected to receive the output current from said network so as to set up a potential drop proportional only to the current flowing in said primary circuit and having a frequency corresponding to the speed of rotation of said primary coil, mechanical rectifying means operated in synchronism with the speed of rotation of said coil to rectify the said last potential, and means connecting said rectified potential in series with said secondary circuit.

5. In a system for electrical prospecting comprising an earth current circuit including a source of current, a pair of spaced earth electrodes, a reversing switch connected in said earth current circuit between said source and said electrodes for converting the current of said source to an alternating current of a controlled frequency, a potential circuit including potential pick-up electrodes located within the field of influence of said earth current, a direct current indicating device connected to indicate the potential of said potential circuit, and a reversing switch connected in said potential circuit between said pick-up electrodes and said indicating device and operated in synchronism with said first reversing switch to convert the picked up potential difference into a uni-directional potential suited to actuate said indicating device, a coupling circuit for interconnecting said earth current circuit and said potential circuit to impress on said potential circuit a balancing potential which is directly proportional to the current flowing in said earth current circuit at the instant of measurement, said coupling circuit comprising magnetically coupled primary and secondary coils, means connecting said primary coil to be energized in accordance with the current flowing in said earth current circuit, means rotating said primary coil at a predetermined speed so as to set up thereby an alternating current in said secondary coil having a frequency of alternation corresponding to the speed of rotation of said rotating coil and whose amplitude is a function of the primary current and of the rate of variation of said flux, and a transmission channel connecting said secondary coil to supply a voltage drop to said secondary circuit, said channel including a filter network having frequency transmission characteristics to compensate for changes in current intensity in said secondary winding due to variation in speed of rotation of said primary coil, so that the current passed by said filter network is unaffected my changes in speed of rotation of said coil and is a function only of the current flowing in said primary circuit, a potentiometer connected to receive the output current from said network to thereby set up a potential drop proportional only to the current flowing in the earth current circuit and having a frequency corresponding to the frequency of rotation of said primary coil, mechanical rectifier means connected to rectify said last potential, said mechanical rectifier means being operated in synchronism with said rotating coil and means connecting said rectified potential in series with said potential circuit to superimpose the potential drop produced in said potentiometer on the potential picked up by said pick-up electrodes, and means adjusting said potentiometer to produce a zero balance on said current measuring device.

HAAKON M. EVJEN.
WILLIAM BRADLEY LEWIS.